United States Patent
Stanfill

(10) Patent No.: US 10,489,191 B2
(45) Date of Patent: Nov. 26, 2019

(54) CONTROLLING TASKS PERFORMED BY A COMPUTING SYSTEM USING CONTROLLED PROCESS SPAWNING

(71) Applicant: Ab Initio Technology LLC, Lexington, MA (US)

(72) Inventor: Craig W. Stanfill, Lincoln, MA (US)

(73) Assignee: Ab Initio Technology LLC, Lexington, MA (US)

(*) Notice: Subject to any disclaimer, the term of this patent is extended or adjusted under 35 U.S.C. 154(b) by 352 days.

(21) Appl. No.: 15/287,296

(22) Filed: Oct. 6, 2016

(65) Prior Publication Data

US 2017/0024250 A1  Jan. 26, 2017

Related U.S. Application Data

(62) Division of application No. 14/259,451, filed on Apr. 23, 2014, now Pat. No. 9,665,396.

(Continued)

(51) Int. Cl.
  *G06F 9/48* (2006.01)
  *G06F 9/448* (2018.01)
(52) U.S. Cl.
  CPC .......... *G06F 9/4843* (2013.01); *G06F 9/4494* (2018.02); *G06F 9/4881* (2013.01)
(58) Field of Classification Search
  None
  See application file for complete search history.

(56) References Cited

U.S. PATENT DOCUMENTS 5,394,549 A * 2/1995 Stringfellow ......... G06F 9/4843
  707/999.104
5,471,622 A * 11/1995 Eadline ................... G06F 8/313
(Continued)

FOREIGN PATENT DOCUMENTS

CN  1302384  2/2007
CN  103559044  2/2014
(Continued)

OTHER PUBLICATIONS

Bureš, Tomáš, Jan Carlson, Ivica Crnkovic, Séverine Sentilles, and Aneta Vulgarakis. "ProCom—the Progress Component Model Reference Manual." version 1.1 (2010).

(Continued)

*Primary Examiner* — Van H Nguyen
(74) *Attorney, Agent, or Firm* — Occhiuti & Rohlicek LLP

(57) ABSTRACT

Controlling tasks includes: receiving ordering information that specifies at least a partial ordering among a plurality of tasks; and generating instructions for performing at least some of the tasks based at least in part on the ordering information. Instructions are stored for executing a first subroutine corresponding to a first task, including a first control section that controls execution of at least a second subroutine corresponding to a second task, the first control section including a function configured to change state information associated with the second task, and to determine whether or not to initiate execution of the second subroutine based on the changed state information. Instructions are stored for executing the second subroutine, including a task section for performing the second task and a second control section that controls execution of a third subroutine corresponding to a third task.

20 Claims, 7 Drawing Sheets

Related U.S. Application Data

(60) Provisional application No. 61/815,052, filed on Apr. 23, 2013.

(56) References Cited

U.S. PATENT DOCUMENTS

| | | | |
|---|---|---|---|
| 5,668,994 A * | 9/1997 | Swagerman | G06F 9/4843 718/102 |
| 5,966,072 A | 10/1999 | Stanfill et al. | |
| 6,316,958 B1 | 11/2001 | Jenkins, IV | |
| 6,378,066 B1 | 4/2002 | Lewis | |
| 6,983,456 B2 | 1/2006 | Poznanovic et al. | |
| 7,167,850 B2 | 1/2007 | Stanfill | |
| 7,467,383 B2 | 12/2008 | Inchingolo et al. | |
| 7,685,602 B1 | 3/2010 | Tran | |
| 7,853,937 B2 | 12/2010 | Janczewski | |
| 7,870,556 B2 | 1/2011 | Wholey, III et al. | |
| 8,006,247 B2 | 8/2011 | Kalman | |
| 8,250,576 B2 * | 8/2012 | Yildiz | G06F 9/461 712/224 |
| 8,561,041 B1 | 10/2013 | Kuznicki et al. | |
| 8,589,925 B2 * | 11/2013 | Cwalina | G06F 9/4806 718/100 |
| 8,667,329 B2 | 3/2014 | Douros et al. | |
| 8,706,667 B2 | 4/2014 | Stanfill et al. | |
| 8,726,228 B2 | 5/2014 | Ravindran et al. | |
| 9,286,119 B2 | 3/2016 | Sevastiyanov et al. | |
| 9,665,396 B2 | 5/2017 | Stanfill | |
| 2004/0073529 A1 | 4/2004 | Stanfill | |
| 2004/0154010 A1 | 8/2004 | Marcuello | |
| 2007/0168902 A1 | 7/2007 | Ogawa et al. | |
| 2008/0178047 A1 | 7/2008 | Bae et al. | |
| 2008/0282246 A1 | 11/2008 | Dolev et al. | |
| 2009/0113436 A1 * | 4/2009 | Cwalina | G06F 9/4806 718/102 |
| 2009/0265777 A1 | 10/2009 | Scott | |
| 2010/0211953 A1 | 8/2010 | Wakeling et al. | |
| 2011/0276968 A1 | 11/2011 | Kand | |
| 2012/0030646 A1 | 2/2012 | Ravindran et al. | |
| 2013/0110576 A1 | 5/2013 | Roy | |
| 2013/0259137 A1 | 10/2013 | Kuusela | |
| 2014/0172939 A1 | 6/2014 | McSherry et al. | |
| 2014/0317632 A1 | 10/2014 | Stanfill | |

FOREIGN PATENT DOCUMENTS

| | | |
|---|---|---|
| CN | 101821721 | 9/2018 |
| JP | 2005258920 | 9/2005 |
| JP | 2010244563 | 10/2010 |
| JP | 2010286931 | 12/2010 |
| JP | 2011517352 | 6/2011 |
| JP | 2012108576 | 7/2012 |
| WO | WO 2009/055494 | 4/2009 |
| WO | 20090108782 | 9/2009 |

OTHER PUBLICATIONS

Babaoglu et al., "Mapping parallel computations onto distributed systems in Paralex," IEEE Comput. Soc. US, pp. 123-130 (1991).
International Search Report and Written Opinion, International Application No. PCT/US2014/035098, dated Sep. 8, 2014 (12 pages).
International Search Report and Written Opinion, PCT Application PCT/US2014/035094, dated Jan. 13, 2015 (18 pages).
M.P. Dieben et al., "Parallel Simulation of Handshake Circuits," (Master's Thesis), Eindhoven University of Technology, Department of Mathematics and Computing Science, Jan. 1994 (70 pages).
U.S. Appl. No. 14/259,451, filed Apr. 23, 2014, Controlling Tasks Performed by a Computing System Using Instructions Generated to Control Initiation of Subroutine Execution.
U.S. Appl. No. 14/259,479, filed Apr. 23, 2014, Controlling Tasks Performed by a Computing System.
Tseng C-W, 'Compiler Optimizations for Eliminating Barrier Synchronization' In Proceedings of the 5th ACM Symposium on Principles and Practice of Parallel Programming (PPOPP'95), Santa Barbara, CA, Jul. 1995.
Hauser R. et al., 'Compiling Process Graphs into Executable Code' in G. Karsai and E. Visser (Eds.): GPCE (Generative Programming and Component Engineering) 2004, LNCS 3286, pp. 317-336, 2004.
Li, Bing, Shingo Mabu, and Kotaro Hirasawa. "Automatic program generation with genetic network programming using subroutines." In SICE Annual Conference 2010, Proceedings of, pp. 3089-3094. IEEE, 2010.
Wei, Yonghe, and Chunjing Shi. "Research of Graph-Based Workflow Access Control." In Computer Science and Computational Technology, 2008. ISCSCT'08. International Symposium on, vol. 2, pp. 58-62. IEEE, 2008.
Zeng, J. et al, "Generating Fast Code from Concurrent Program Dependence Graphs", ACM SIGPLAN Notices, vol. 39, No. 7, 2004.

* cited by examiner

CONTROLLING TASKS PERFORMED BY A COMPUTING SYSTEM USING CONTROLLED PROCESS SPAWNING

CROSS-REFERENCE TO RELATED APPLICATIONS

This application is a divisional application of U.S. application Ser. No. 14/259,451 (now U.S. Pat. No. 9,665,396), filed on Apr. 23, 2014, which claims priority to U.S. Application No. 61/815,052, filed on Apr. 23, 2013, each of which is incorporated herein by reference in its entirety. This application is also related to co-owned U.S. application Ser. No. 14/259,479, filed on Apr. 23, 2014, incorporated herein by reference in its entirety.

BACKGROUND

This description relates to controlling tasks performed by a computing system.

In some techniques for controlling tasks performed by a computing system, an individual task is performed by a process or thread that is spawned for that task and terminates after that task has been completed. An operating system of the computing system, or other centralized control entity that uses features of the operating system, may be used to schedule different tasks, or manage communication between different tasks. A control flow graph may be used to define a partial ordering of tasks by indicating certain upstream tasks (e.g., task A) that must complete before other downstream tasks (e.g., task B) begin. There may be a control process that manages spawning of new processes for performing tasks according to the control flow graph. After the control process spawns process A for performing task A, the control process awaits notification by the operating system that process A has terminated. After process A has terminated, the operating system notifies the control process, and then the control process spawns process B for performing task B.

SUMMARY

In one aspect, in general, a method for controlling tasks performed by a computing system includes: receiving ordering information that specifies at least a partial ordering among a plurality of tasks; and generating, using at least one processor, instructions for performing at least some of the tasks based at least in part on the ordering information. The generating includes: storing instructions for executing a first subroutine corresponding to a first task, the first subroutine including a first control section that controls execution of at least a second subroutine corresponding to a second task, the first control section including a function configured to change state information associated with the second task, and to determine whether or not to initiate execution of the second subroutine based on the changed state information; and storing instructions for executing the second subroutine, the second subroutine including a task section for performing the second task and a second control section that controls execution of a third subroutine corresponding to a third task.

Aspects can include one or more of the following features.

The ordering information includes a control flow graph that includes directed edges between pairs of the nodes that represent respective tasks, where a directed edge from an upstream node to a downstream node indicates that the task represented by the upstream node precedes the task represented by the downstream node in the partial ordering.

The control flow graph includes a directed edge between a first node representing the first task and a second node representing the second task, and a directed edge between the second node and a third node representing the third task.

The function is configured to: decrement or increment a counter associated with the second task, and determine whether or not to initiate execution of the second subroutine based on the value of the counter.

The function is configured to perform an atomic operation that atomically decrements or increments the counter and reads a value of the counter.

The changed state information comprises a history of previous calls of the function with an argument that identifies the second task.

The function is one of a plurality of different functions, and the state information captures a history of previous calls of any of the plurality of different functions with an argument that identifies the second task.

The second control section includes logic that determines whether or not the task section for performing the task is called.

The logic determines whether or not the task section for performing the task is called based on the value of a flag associated with the second task.

The first control section controls execution of at least: the second subroutine corresponding to the second task, and a fourth subroutine corresponding to a fourth task.

The ordering information indicates that the first task precedes the second task in the partial ordering, and indicates that the first task precedes the fourth task in the partial ordering, and does not constrain the order of the second and forth tasks relative to each other in the partial ordering.

The first control section includes: a first function that determines whether or not to spawn a new process for executing the second subroutine, and a second function that initiates execution of the fourth subroutine using the same process that executed the first subroutine.

In another aspect, in general, a computer program is stored on a computer-readable storage medium, for controlling tasks. The computer program includes instructions for causing a computing system to: receive ordering information that specifies at least a partial ordering among a plurality of tasks; and generate instructions for performing at least some of the tasks based at least in part on the ordering information. The generating includes: storing instructions for executing a first subroutine corresponding to a first task, the first subroutine including a first control section that controls execution of at least a second subroutine corresponding to a second task, the first control section including a function configured to change state information associated with the second task, and to determine whether or not to initiate execution of the second subroutine based on the changed state information; and storing instructions for executing the second subroutine, the second subroutine including a task section for performing the second task and a second control section that controls execution of a third subroutine corresponding to a third task.

In another aspect, in general, a computing system for controlling tasks includes: an input device or port configured to receive ordering information that specifies at least a partial ordering among a plurality of tasks; and at least one processor configured to generate instructions for performing at least some of the tasks based at least in part on the ordering information. The generating includes: storing instructions for executing a first subroutine corresponding to a first task, the first subroutine including a first control section that controls execution of at least a second subroutine corresponding to a second task, the first control section including a function configured to change state information associated with the second task, and to determine whether or not to initiate execution of the second subroutine based on the changed state information; and storing instructions for executing the second subroutine, the second subroutine including a task section for performing the second task and a second control section that controls execution of a third subroutine corresponding to a third task.

In another aspect, in general, a computing system for controlling tasks includes: means for receiving ordering information that specifies at least a partial ordering among a plurality of tasks; and means for generating instructions for performing at least some of the tasks based at least in part on the ordering information. The generating includes: storing instructions for executing a first subroutine corresponding to a first task, the first subroutine including a first control section that controls execution of at least a second subroutine corresponding to a second task, the first control section including a function configured to change state information associated with the second task, and to determine whether or not to initiate execution of the second subroutine based on the changed state information; and storing instructions for executing the second subroutine, the second subroutine including a task section for performing the second task and a second control section that controls execution of a third subroutine corresponding to a third task.

In another aspect, in general, a method for performing tasks includes: storing, in at least one memory, instructions for performing a plurality of tasks, the instructions including, for each of at least some of the tasks, a respective subroutine that includes a task section for performing that task and a control section that controls execution of a subroutine of a subsequent task; and executing, by at least one processor, at least some of the stored subroutines. The executing includes: spawning a first process for executing a first subroutine for a first task, the first subroutine including a first task section and a first control section; and after the first task section returns, calling at least one function included in the first control section that determines whether or not to spawn a second process for executing a second subroutine.

Aspects can include one or more of the following features.

The function is configured to: decrement a counter associated with the second subroutine, and determine whether or not to initiate execution of the second subroutine based on the value of the counter.

The function, when called with an argument that identifies a second task corresponding to the second subroutine, is configured to determine whether or not to initiate execution of the second subroutine based on state information that captures a history of previous calls of the function with an argument that identifies the second task.

The function is one of a plurality of different functions, and the state information captures a history of previous calls of any of the plurality of different functions with an argument that identifies the second task.

The function is configured to: initiate execution of the second subroutine in the first process, and spawn the second process to continue execution of the second subroutine in response to execution time of the second subroutine passing a predetermined threshold.

The function is configured to provide the second process a stack frame that was associated with the first process.

The function is configured to return after spawning the second process to enable the first process to continue executing concurrently with the second process.

The first control section includes logic that determines whether or not the first task section is called.

The logic determines whether or not the first task section is called based on the value of a flag associated with the first task.

The second subroutine corresponds to a second task, and the first control section is based at least in part on ordering information that specifies at least a partial ordering among a plurality of tasks that include the first task and the second task.

The ordering information includes a control flow graph that includes directed edges between pairs of the nodes that represent respective tasks, where a directed edge from an upstream node to a downstream node indicates that the task represented by the upstream node precedes the task represented by the downstream node in the partial ordering.

In another aspect, in general, a computer program is stored on a computer-readable storage medium, for performing tasks. The computer program includes instructions for causing a computing system to: store instructions for performing a plurality of tasks, the instructions including, for each of at least some of the tasks, a respective subroutine that includes a task section for performing that task and a control section that controls execution of a subroutine of a subsequent task; and execute at least some of the stored subroutines. The executing includes: spawning a first process for executing a first subroutine for a first task, the first subroutine including a first task section and a first control section; and after the first task section returns, calling at least one function included in the first control section that determines whether or not to spawn a second process for executing a second subroutine.

In another aspect, in general, a computing system for performing tasks includes: at least one memory storing instructions for performing a plurality of tasks, the instructions including, for each of at least some of the tasks, a respective subroutine that includes a task section for performing that task and a control section that controls execution of a subroutine of a subsequent task; and at least one processor configured to execute at least some of the stored subroutines. The executing includes: spawning a first process for executing a first subroutine for a first task, the first subroutine including a first task section and a first control section; and after the first task section returns, calling at least one function included in the first control section that determines whether or not to spawn a second process for executing a second subroutine.

In another aspect, in general, a computing system for performing tasks includes: means for storing instructions for performing a plurality of tasks, the instructions including, for each of at least some of the tasks, a respective subroutine that includes a task section for performing that task and a control section that controls execution of a subroutine of a subsequent task; and means for executing at least some of the stored subroutines. The executing includes: spawning a first process for executing a first subroutine for a first task, the first subroutine including a first task section and a first control section; and after the first task section returns, calling at least one function included in the first control section that determines whether or not to spawn a second process for executing a second subroutine.

Aspects can include one or more of the following advantages.

When tasks are performed by a computing system, there is a cost in processing time associated with spawning new processes for executing the tasks, and associated with swapping back and forth between the task processes and a scheduler or other central process that maintains task dependency and ordering. The techniques described herein enable new processes to be selectively spawned, or running processes to be selectively reused, in a manner that is computationally efficient. A compiler is able to avoid the need to rely solely on a centralized scheduler with a decentralized scheduling mechanism based on a relatively small amount of code added to subroutines for executing the tasks. Completion of tasks automatically leads to the computing system performing other tasks according to an input constraint, such as a control flow graph, in a way that allows for concurrency and conditional logic. Compiler generated code associated with a task calls functions at runtime to determine whether or not to perform other tasks based on state information stored in counters and flags. Thus, the compiler generated code is effectively implementing a state machine that controls the calling of task subroutines at runtime. Without the extra overhead of switching to and from a scheduler, the computing system can more efficiently execute fine-grained potentially concurrent tasks.

Other features and advantages of the invention will become apparent from the following description, and from the claims.

DESCRIPTION

Figure 1:
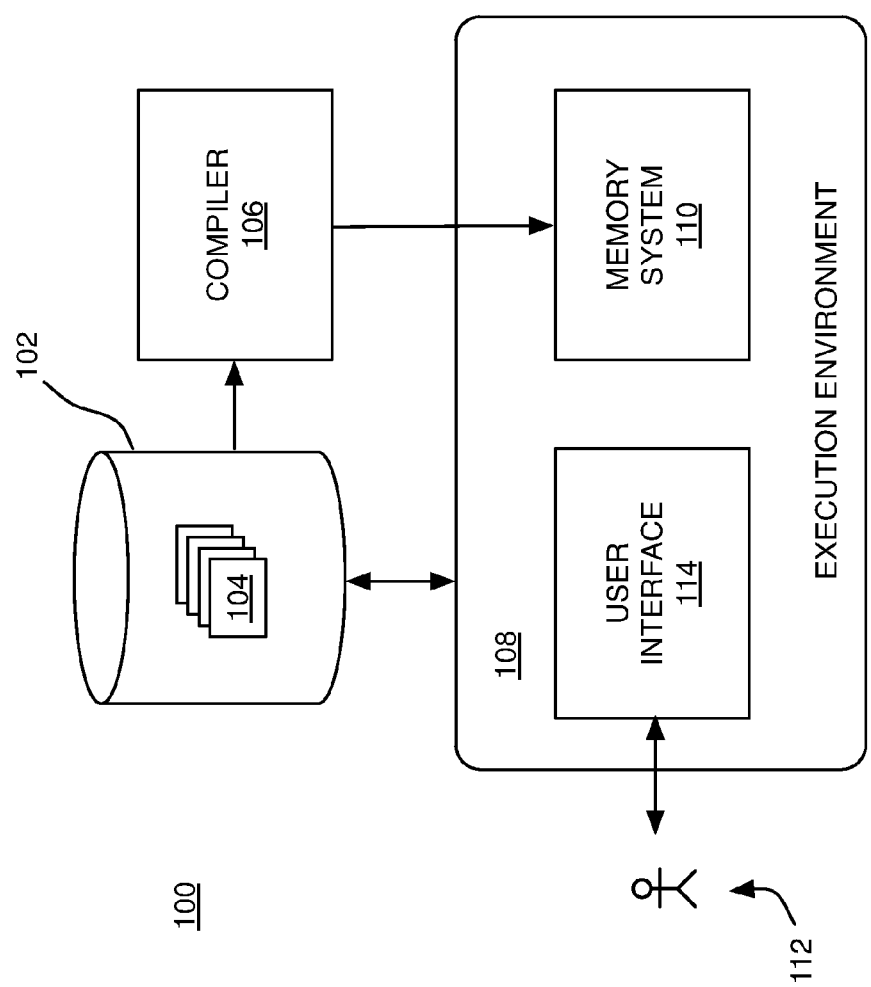
FIG. 1 is a block diagram of a computing system.

FIG. 1 shows an example of a computing system 100 in which the task control techniques can be used. The system 100 includes a storage system 102 for storing task specifications 104, a compiler 106 for compiling the task specifications into task subroutines for performing the tasks, and an execution environment 108 for executing task subroutines loaded into a memory system 110. Each task specification 104 encodes information about what tasks are to be performed, and constraints on when those tasks can be performed, including ordering constraints among different tasks. Some of the task specifications 104 may be constructed by a user 112 interacting over a user interface 114 of the execution environment 108. The execution environment 108 may be hosted, for example, on one or more general-purpose computers under the control of a suitable operating system, such as a version of the UNIX operating system. For example, the execution environment 108 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof. Storage device(s) providing the storage system 102 may be local to the execution environment 108, for example, being stored on a storage medium connected to a computer hosting the execution environment 108 (e.g., a hard drive), or may be remote to the execution environment 108, for example, being hosted on a remote system in communication with a computer hosting the execution environment 108, over a remote connection (e.g., provided by a cloud computing infrastructure).

Figure 2A:
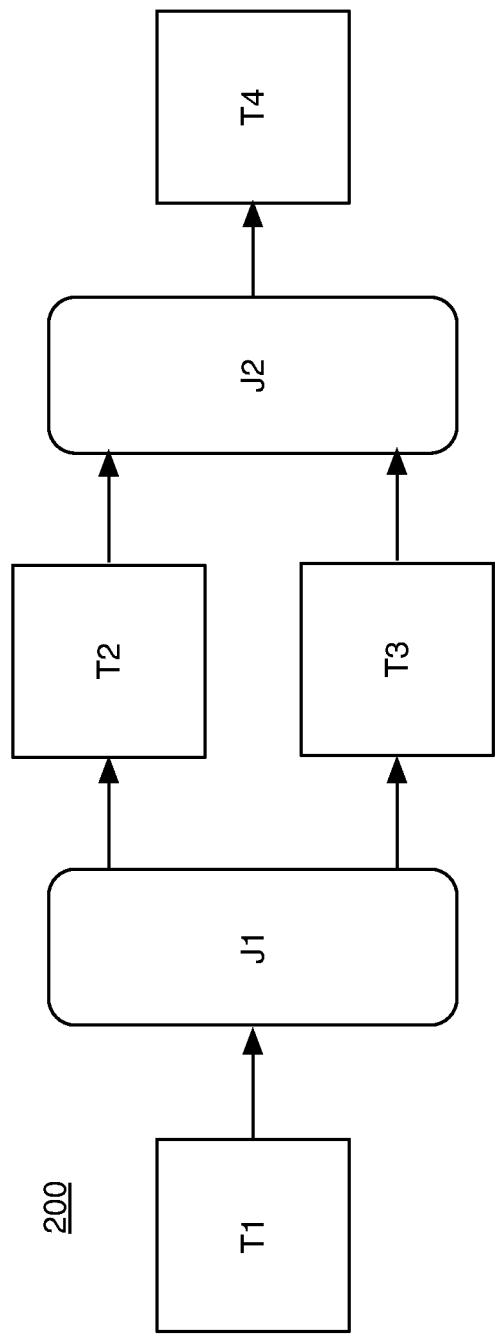
FIG. 2A is a diagram of a control flow graph.

FIG. 2A shows an example of a control flow graph 200 that defines a partial ordering to be imposed on a set of tasks to be performed by the computing system 100. The partial ordering defined by the control flow graph 200 is encoded in a stored task specification 104. In some implementations, the user 112 selects various types of nodes to be included in a control flow graph, and connects some of those nodes with links that represent an ordering constraint between the connected nodes. One type of node is a task node, represented by square-corner blocks in FIG. 2A. Each task node represents a different task to be performed. A directed link connected from a first task node (at the origin of the directed link) to a second task node (at the destination of the directed link) imposes the ordering constraint that the first node's task must complete before the second node's task can begin. Another type of node is a junction node, represented by rounded-corner blocks in FIG. 2A. Unless the control flow graph includes conditional behavior, a junction node simply serves to impose an ordering constraint. A junction node with a single input link and multiple output links imposes an ordering constraint such that the task of the task node connected by the input link must complete before any task of a task node connected by an output link can begin. A junction node with multiple input links and a single output link imposes an ordering constraint such that all tasks of the task nodes connected by an input link must complete before the task of the task node connected by the output link can begin. A task node can also be a destination of multiple input links, imposing an ordering constraint such that all tasks of the task nodes connected by an input link must complete before the task of that task node can begin. With conditional behavior, a task node with multiple input links also provides different logical behavior than a junction node with multiple inputs, as described in more detail below.

After a control flow graph has been constructed, the compiler 106 compiles the task specification 104 that encodes task information and ordering information represented by that control flow graph, and generates instructions for performing the tasks. The instructions may be in the form of low-level machine code that is ready to be executed, or in the form of higher level code that is further compiled to provide the low-level machine code that will ultimately be executed. The generated instructions include a subroutine for each task node (a "task subroutine"), and a subroutine for each junction node (a "junction subroutine"). Each of the task subroutines includes a task section (also called a task body) for performing a corresponding task. A task node includes some description of the corresponding task to be performed such that the compiler is able to generate an appropriate task section. For example, in some implementations, a task node identifies a particular function to be called, a program to be run, or other executable code to be included in the task section. Some of the task subroutines may also include a control section that controls execution of a subsequent subroutine for another node in the control flow graph. A task subroutine for a task node that is not connected to any downstream nodes may not need a control section since control does not need to be passed to any subsequent task after its completion. Each of the junction subroutines includes a control section as its main body since the purpose of a junction node is to specify a constraint on the flow of control.

An example of a function included in the control section is a "chain" function, which determines whether or not to spawn a new process for executing a subroutine for a subsequent node based on state information associated with the nodes of the control flow graph. The argument of the chain function identifies that subsequent node. The table below shows an example of function included in subroutines written by the compiler for each of the nodes of the control flow graph 200, where the task section of task subroutines is represented by the function call T#( ) and the rest of the subroutine is considered to represent the control section. (In other examples, the task section may include multiple function calls, with the task being completed after the last function returns.) Junction subroutines do not include a task section, and are therefore made up entirely of a control section. In this example, separate function calls are separated by a semicolon, in the order in which they are to be called.

TABLE 1

| Node | Subroutine |
| --- | --- |
| task node T1 | T1( ); chain(J1) |
| junction node J1 | chain (T2); chain(T3) |
| task node T2 | T2( ); chain(J2) |
| task node T3 | T3( ); chain(J2) |
| junction node J2 | chain(T4) |
| task node T4 | T4( ) |

After the task specification 104 has been compiled, the computing system 100 loads the generated subroutines into the memory system 110 of the execution environment 108. When a particular subroutine is called, a program counter will be set to a corresponding address at the start of a portion of an address space of the memory system 110 where the subroutine is stored.

At a scheduled time, or in response to user input or a predetermined event, the computing system 100 begins to execute at least one of the loaded subroutines representing a root of the control flow graph. For example, for the control flow graph 200, the computing system 100 spawns a process for executing the task subroutine for the task node T1. As the subroutine starts execution, the process will first call the task section for performing the task of task node T1, and then after the task section returns (indicating completion of the task of task node T1), the process will call the chain function in the control section of the subroutine. The state information used by the chain function to determine whether or not to spawn a new process for executing a subroutine for a particular node is information that captures the history of previous chain functions called with that particular node as an argument, as described in more detail below.

This history information can be maintained in activation counters associated with different nodes. The values of the counters can be stored, for example, in a portion of the memory system 110, or in other working storage. Before the first process is spawned, the value of the activation counter for each node is initialized to the number of input links into that node. So, for the control flow graph 200, there are six activation counters initialized to following values.

TABLE 2

| Node | Activation Counter Value |
| --- | --- |
| task node T1 | 0 |
| junction node J1 | 1 |
| task node T2 | 1 |
| task node T3 | 1 |
| junction node J2 | 2 |
| task node T4 | 1 |

Since the task node T1 does not have any input links, its activation counter is initialized to zero. Alternatively, for an initial node, which does not have any input links, there does not need to be an activation counter associated with that node. The control section of different nodes that are connected over an input link will decrement the activation counter of the downstream linked node and will determine an action based on the decremented value. In some implementations, the functions that access the counters can use an atomic operation that atomically decrements the counter and reads a value of the counter either before or after the decrement operation (e.g., an atomic "decrement-and-test" operation). In some systems, such operations are supported by native instructions of the system. Alternatively, instead of decrementing the counter until its value reaches zero, the counter can start at zero and the functions can increment the counter until its value reaches a predetermined threshold that has been initialized to the number of input links into a node (e.g., using an atomic "increment-and-test" operation).

A call to the chain function "chain(N)" decrements the activation counter of node N, and if the decremented value is zero, the chain function triggers execution of the subroutine of node N by a newly spawned process, and then returns. If the decremented value is greater than zero, the chain function simply returns without triggering execution of a new subroutine or spawning a new process. The control section of a subroutine may include multiple calls to the chain function, as in the junction subroutine for the junction node J1 in Table 1. After the last function in the control section returns, the process executing the subroutine may exit, or for some function calls (e.g., for the "chainTo" function call described below), the process continues executing another subroutine. This conditional spawning of new processes enables task subroutines to be executed (potentially concurrently) according to a desired partial ordering, without requiring switching to and from a scheduler process to manage the spawning of new processes.

For the subroutines of Table 1, the call to the chain function "chain(J1)" after the task section for task subroutine T1 returns results in the activation counter for node J1 being decremented from 1 to 0, resulting in execution of the junction subroutine, which includes the calls to the chain function "chain(T2)" and "chain(T3)." Each of these calls result in the respective activation counters for nodes T2 and T3 to be decremented from 1 to 0, resulting in the execution of the task subroutines for nodes T2 and T3. Both task subroutines include a control section that calls "chain(J2)," which decrements the activation counter for node J2. Whichever of the task bodies for nodes T2 and T3 finishes first will lead to a call to a chain function that decrements the activation counter for node J2 from 2 to 1. The task section to finish second will lead to a call to a chain function that decrements the activation counter for node J2 from 1 to 0. Thus, only the last of the tasks to complete will result in execution of the junction subroutine for node J2, which leads to the last call to a chain function "chain(T4)" and decrementing of the activation counter for node T4 from 1 to 0, which initiates execution of the task subroutine for node T4.

After the task section for node T4 returns, the control flow is complete since there is no control section for the task subroutine for node T4.

In the example of the subroutines of Table 1, a new process is spawned for the subroutine of each node in the control flow graph 200. While some efficiency is obtained by the subroutine of each process including a control section that determines whether or not to spawn a new process in its own without requiring a central task monitoring or scheduling process, even more efficiency can be obtained by certain compiler optimizations to the control sections. For example, in one compiler optimization, if there is a single call to the chain function in a control section of a first subroutine, then the next subroutine (i.e., the argument of that chain function) can be executed (when the activation counter reaches zero) within the same process that is executing the first subroutine—a new process does not need to be spawned. One way to accomplish this is for the compiler to explicitly generate a different function call (e.g., a "chainTo" function instead of the "chain" function) for the last output link of a node. The chainTo function is like the chain function, except that instead of spawning a new process to execute the subroutine of its argument when the activation counter is zero, it causes the same process to execute the subroutine of its argument. If a node has a single output link, then its compiled subroutine will have a control section with a single call to the chainTo function. If a node has multiple output links, then its compiled subroutine will have a control section with one or more calls to the chain function and a single call to the chainTo function. This reduces the number of subroutine spawned in independent processes and their associated startup overhead. Table 3 shows an example of subroutines that would be generated for the control flow graph 200 using this compiler optimization.

TABLE 3

| Node | Subroutine |
| --- | --- |
| task node T1 | T1( ); chainTo(J1) |
| junction node J1 | chain(T2); chainTo(T3) |
| task node T2 | T2( ); chainTo(J2) |
| task node T3 | T3( ); chainTo(J2) |
| junction node J2 | chainTo(T4) |
| task node T4 | T4( ) |

Figure 2B:
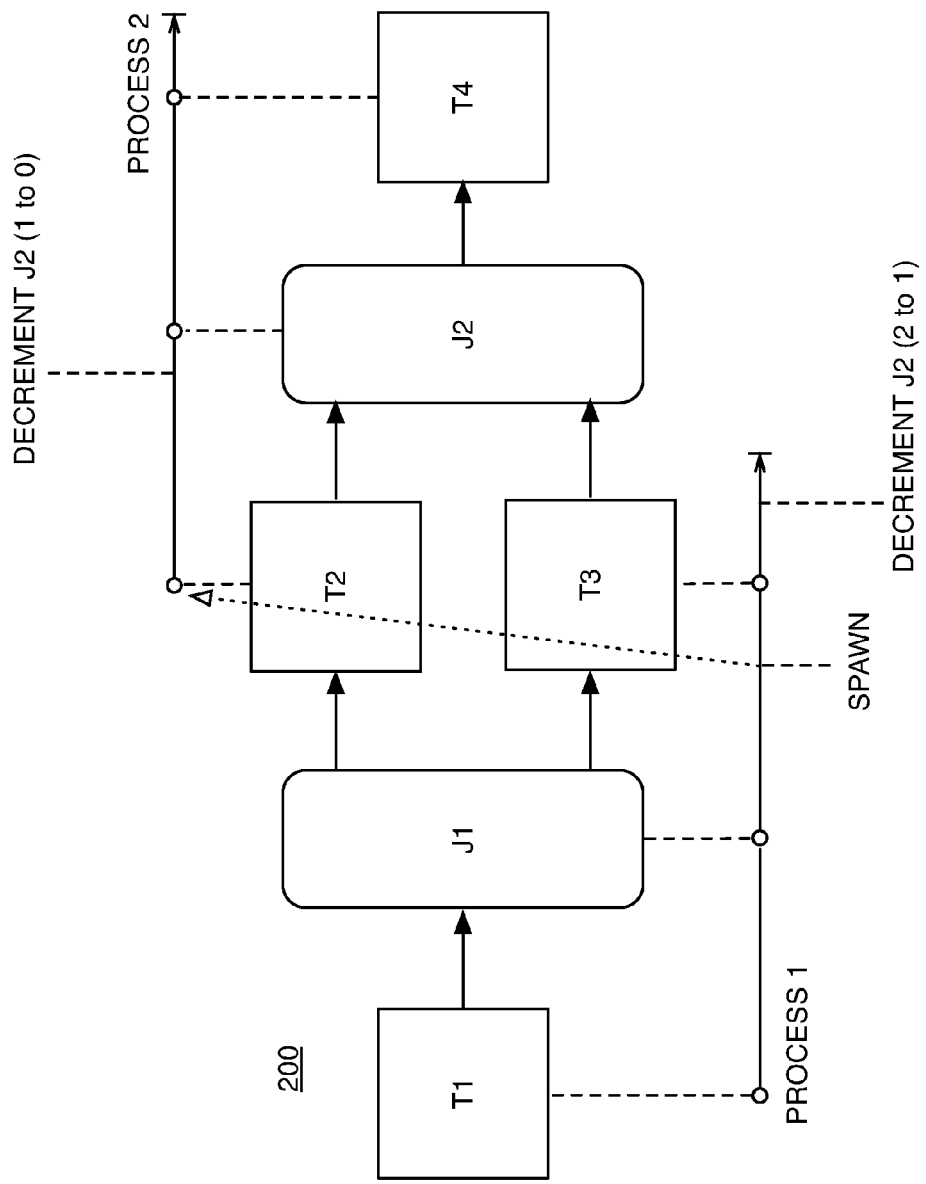
FIG. 2B-2D are diagrams of process lifetimes associated with execution of subroutines for the nodes of the control flow graph of FIG. 2A.

In the example of the subroutines of Table 3, a first process executes the subroutines of nodes T1 and J1, and then a new process is spawned to execute the subroutine of node T2, while the first process continues to execute the subroutine of node T3. Whichever of these two processes is the first to return from their respective task section is the first to decrement the activation counter of junction node J2 (from 2 to 1), and then it exits. The second process to return from its task section decrements the activation counter of junction node J2 from 1 to 0, and then it continues by executing the subroutine of junction node J2, which is the function call "chainTo(T4)," and finally the subroutine of task node T4. FIG. 2B shows an example of the lifetimes of the first and second processes as they execute subroutines for different nodes in the control flow graph 200, for a case in which the task of node T3 finishes before the task of node T2. The points along the lines that represent the processes correspond to execution of subroutines for different nodes (connected to the points by dashed lines). The lengths of the line segments between the points are not necessarily proportional to the time elapsed, but are just meant to show the relative order in which different subroutines are executed, and where the new process is spawned.

Another example of a modification that can potentially improve efficiency further is delayed spawning of new process until a threshold is met that indicates that a particular subroutine may benefit from concurrency. Concurrent execution of multiple subroutines by different processes is especially beneficial if each of the subroutines takes a significant amount of time to complete. Otherwise, if any of the subroutines takes a relatively short amount of time to complete compared to other subroutines, that subroutine could be executed serially with another subroutine without much loss in efficiency. The delayed spawning mechanism allows multiple tasks that take a significant amount of time, and are able to be performed together, to be performed by concurrently running processes, but also attempts to prevent spawning of a new process for shorter tasks.

In an alternative implementation of the chain function that uses delayed spawning, the chain function, like the chainTo function, causes the same process to start execution of the subroutine of its argument. But, unlike the chainTo function, a timer tracks the time it takes to execute the subroutine, and if a threshold time is exceeded, the chain function spawns a new process to continue execution of the subroutine. The first process can continue as if the subroutine had completed, and the second process can take over execution of the subroutine where the first process left off. One mechanism that can be used to accomplish this is for the second process to inherit the subroutine's stack frame from the first process. The stack frame for a subroutine that is being executed includes a program counter that points to a particular instruction, and other values including related to the subroutine execution (e.g., local variables and register values). In this example, the stack frame of the task subroutine for T2 would include a return pointer that enables a process to return to the junction subroutine for J1 after completion of the task subroutine for T2. When the delayed spawning timer is exceeded, a new process is spawned and is associated with the existing stack frame of the task subroutine for T2, and the first process immediately returns to the junction subroutine for J1 (to call "chainTo(T3)"). The return pointer in the inherited stack frame is removed (i.e., nulled out) since the new process does not need to return to the junction subroutine for J1 after completion of the task subroutine for T2. So, delayed spawning enables a subroutine for a subsequent task to be performed without the overhead of spawning a new process for cases in which the task is quick (relative to a configurable threshold), and reduces the overhead involved in spawning a new process for cases in which the task is longer by inheriting an existing stack frame.

Figure 2C:
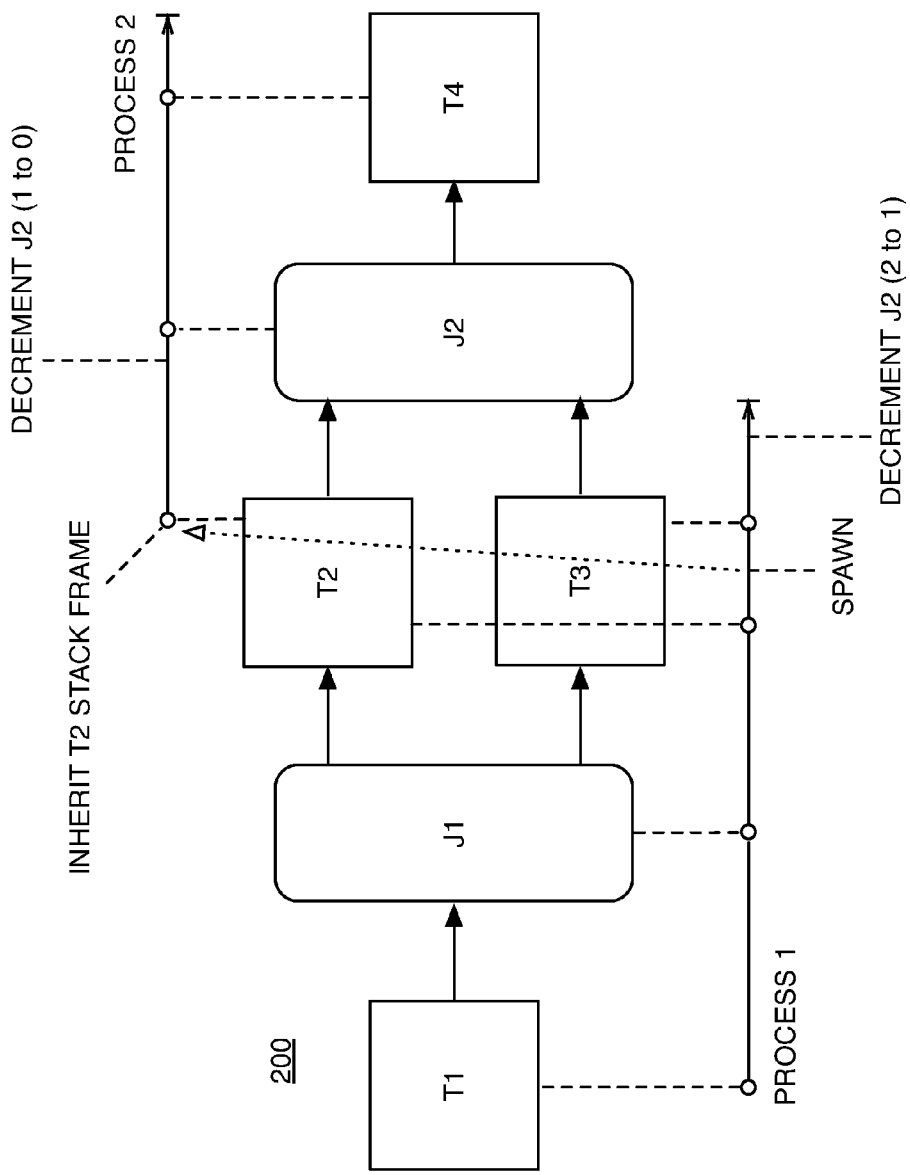

FIG. 2C shows an example of the lifetime of the first and second processes as they execute subroutines for different nodes in the control flow graph 200, for a case in which the task of node T2 is longer than the delayed spawning threshold. When the spawning threshold is reached, process 1 spawns process 2, which inherits the stack frame of the subroutine performing the task of node T2 and continues executing that subroutine. In this example, the task of node T3 (performed by process 1) finishes before the task of node T2 (started by process 1 and completed by process 2) finishes. So, in this example, it is process 1 that decrements the activation counter of J2 from 2 to 1 (and then exits), and it is process 2 that decrements the activation counter of J2 from 1 to 0, resulting in process 2 performing the task of task node T4. In this example, concurrent execution of the task of node T2 and the task of node T3 is allowed, after it is determined that such concurrency will contribute to overall efficiency.

Figure 2D:
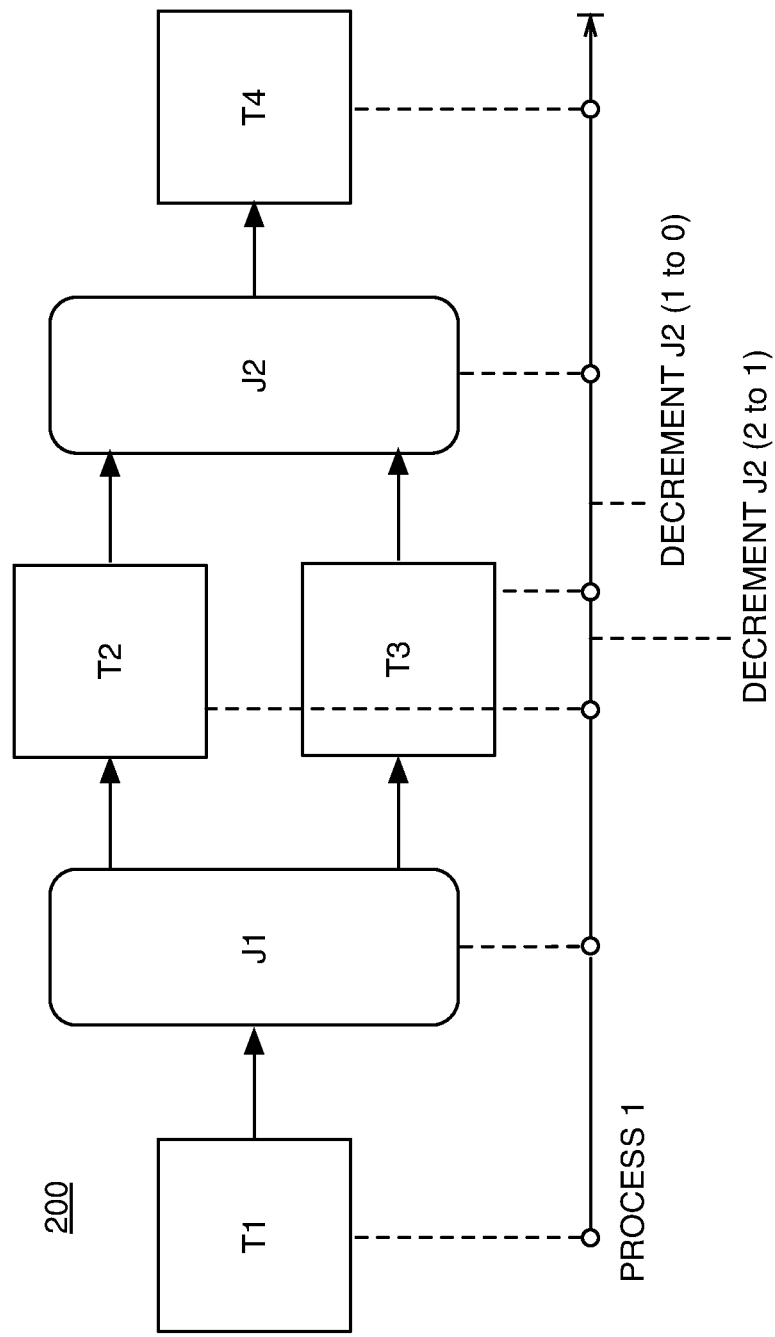

FIG. 2D shows an example of the lifetime of a single process as it executes subroutines for different nodes in the control flow graph 200, for a case in which the task of node T2 is shorter than the delayed spawning threshold. In this example, the task of node T2 (performed by process 1) finishes before the task of node T3 (also performed by process 1). So, in this example, process 1 decrements the activation counter of J2 from 2 to 1 after completing the task of node T2, and process 1 decrements the activation counter of J2 from 1 to 0 after completing the task of node T3, resulting in process 1 performing the task of task node T4. In this example, concurrent execution of the tasks of node T2 and node T3 is sacrificed for the efficiency gained by avoiding the need to spawn a second process, after it is determined that task of node T2 can be completed quickly.

Figure 3:
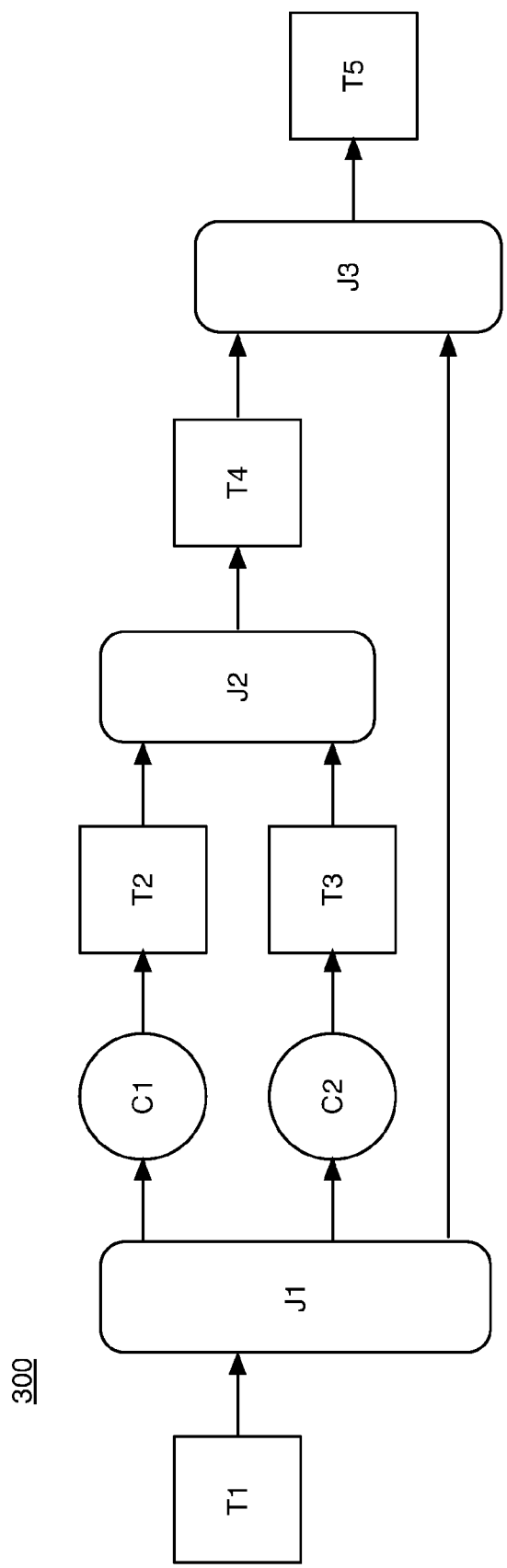
FIGS. 3 and 4 are diagrams of control flow graphs.

Another type of node that can be included in a control flow graph is a condition node, represented by circles in a control flow graph 300 shown in FIG. 3. Condition nodes define conditions for determining whether or not a task of a task node connected to the output of the condition node is to be performed. If at runtime the defined condition is true then control flow proceeds downstream past that condition node, but if at runtime the defined condition is false then control flow does not proceed past that condition node. If the condition is false, then tasks of task nodes downstream of the condition node are only performed if there are other paths through the control flow graph that lead to those task nodes (and are not themselves blocked by other false condition nodes).

The compiler generates a "condition subroutine" for each condition node, and also uses the condition defined by a condition node to modify the subroutines of certain other nodes downstream of the condition node. For example, the compiler may generate instructions for a "skip mechanism" that will be applied at runtime to follow the flow of control defined by the control flow graph. In the skip mechanism, each node has an associated "skip flag" controlling whether or not the corresponding task section (if any) is executed. If the skip flag is set, then execution of the task section is suppressed (with the node being in a "suppressed" state), and this suppression may be propagated to other tasks by appropriate control code that was placed into the control section by the compiler. In the previous examples, the task section of a task subroutine preceded the control section. In the following examples, the control section of some task subroutines includes control code that occurs before the task section (also called a "prologue") and control code that occurs after the task section (also called an "epilogue"). For example, to implement this skip mechanism the compiler includes in the prologue (i.e., code to be executed before the task section) conditional instructions (e.g., if statements) and calls to a "skip function," which is called with an argument that identifies a downstream node. The compiler includes in the epilogue (i.e., code to be executed after the task section) calls to the chain or chainTo function. In some cases, only the prologue may be executed and both the task section and the epilogue may be skipped due to the stored state represented by the values of the skip flags. Table 4 shows an example of subroutines that would be generated for the control flow graph 300.

TABLE 4

| Node | Subroutine |
| --- | --- |
| task node T1 | T1( ); chainTo(J1) |
| junction node J1 | chain(C1); chain(C2); chainTo(J3) |
| condition node C1 | if (<condition1>)<br>    chainTo(T2)<br>else<br>    skip(T2) |
| condition node C2 | if (<condition2>)<br>    chainTo(T3)<br>else<br>    skip(T3) |
| task node T2 | if (skip)<br>    skip(J2)<br>else<br>    T2( ); chainTo(J2) |
| task node T3 | if (skip)<br>    skip(J2)<br>else<br>    T3( ); chainTo(J2) |
| junction node J2 | if (skip)<br>    skip(T4)<br>else<br>    chainTo(T4) |
| task node T4 | if (skip)<br>    skip(J3)<br>else<br>    T4( ); chainTo(J3) |
| junction node J3 | if (skip)<br>    skip(T5)<br>else<br>    chainTo(T5) |
| task node T5 | if (skip)<br>    return<br>else<br>    T5( ) |

Like the chain and chainTo functions, the skip function "skip(N)" decrements the activation counter of its argument (node N) and executes the corresponding subroutine if the decremented value is 0. In this example, the skip function follows the behavior of the chainTo function by continuing to use the same process without spawning a new one, however, the compiler can use two versions of the skip function that behave as the chain and chainTo functions do to control task spawning in a similar manner. The compiler generates subroutines for nodes downstream of a conditional node such that, if the skip flag of the node whose subroutine is being executed is set (i.e., evaluates to a Boolean true value), it calls skip on the downstream node without calling a task section, and if the skip flag is cleared (i.e., evaluates to a Boolean false value), it does call a task section (if the node is a task node) and calls chain on the downstream node. Alternatively, the compiler can include conditional statements in the control sections of subroutines by default without having to determine which nodes are downstream of a conditional node. In particular, an "if" statement to check the skip flag can be included by default for the subroutine of every node without the compiler having to determine whether or not to include it (though that may lead to unnecessary checking of the skip flag).

If there are condition nodes in a control flow graph, then nodes with multiple inputs acquire a logical behavior at runtime that depends on the type of the node. A junction node with multiple input links and a single output link corresponds to a logical "OR" operation, such that at least one input node connected by an input link must have its subroutine execute a chain call (and not a skip call) if the output node connected by the output link is to have its subroutine be the argument of a chain call (and not a skip call). A task node with multiple input links and a single output link corresponds to a logical "AND" operation, such that all of the input nodes connected by an input link must have their subroutines execute a chain call (and not a skip call) if the subroutine of that task node is to be the argument of a chain call (and not a skip call).

To ensure this logical behavior, the skip flags associated with the nodes are set and cleared at runtime according to predetermined rules. Initial values of the skip flags are provided during an initialization phase that occurs before execution of any of the subroutines of the nodes in the control flow graph, and also depend on the type of the node. The compiler also uses different versions of the skip function and chain function, which have different behavior depending on the type of the node. One example of the predetermined set of rules for changing the skip flag of a node N, and the behavior of the different versions of functions used by the compiler, is as follows.

For a multi-input junction node (an OR operation): skip flag is initially set, skip_OR(N) does not change skip flag, chain_OR(N) clears skip flag For a multi-input task node (an AND operation): skip flag is initially cleared, skip_AND(N) sets skip flag, chain_AND(N) does not change skip flag For a single-input node: skip flag is initially set, skip(N) does not change skip flag, chain(N) clears skip flag The behavior of the chainTo function is the same as the chain function with respect to the skip flag. For a single-input node, the behaviors of the OR operation and the AND operation are equivalent, and either can be used (such as the behavior of the OR operation in this example). For this set of rules, the starting node(s) (i.e., nodes without any input links) have their skip flag cleared (if its initial value is not already cleared).

For the control flow graph 300, consider the case in which the condition for node C1 is true, the condition for node C2 is false, and the task for node T3 finishes before the node C2 condition check is completed: the subroutine for node T3 would follow chain logic (as opposed to skip logic), which clears the skip flag of node J2, and decrements the activation counter for node J2 (from 2 to 1); and then the subroutine for node T4 follows skip logic (which does not change the skip flag), and decrements the activation counter for node J2 (from 1 to 0), which leads to chain(T5) since the skip flag of node J2 was cleared by the subroutine of node T3.

Other rules are also possible. Another example of the predetermined set of rules for changing the skip flag of a node N, and the behavior of the different versions of functions used by the compiler, is as follows.

For a junction node: skip flag is initially set, skip_J(N) does not change skip flag, chain_J(N) clears skip flag For a task node or conditional node: skip flag is initially cleared, skip(N) sets skip flag, chain(N) does not change skip flag For this set of rules, the starting node(s) (i.e., nodes without any input links) will also have their skip flag cleared (if its initial value is not already cleared).

The compiler can optionally perform a variety of optimizations of conditional statements or other instructions in the control section of subroutines based on analysis of the control flow graph. For example, from the control flow graph 300, it can be determined that the task of task node T5 will not be skipped regardless of whether the conditions of condition nodes C1 and C2 are true or false, because there is a link between junction node J1 and junction node J3 that will ultimately lead to the execution of the task of task node T5. So, the compiler is able to generate a subroutine for task node T5 that avoids a check of its skip flag and simply calls its task section T5( ). Other optimizations can be made by the compiler, for example, by leaving out intermediate skip flag checks and skip function calls for cases in which an entire section of a control flow graph is to be skipped after a conditional node, as long as any other inputs a downstream node after the skipped section are handled appropriately (i.e., decrementing the counter of the downstream node the number of times that it would have been decremented if the intermediate calls for the skipped section had been included).

Figure 4:
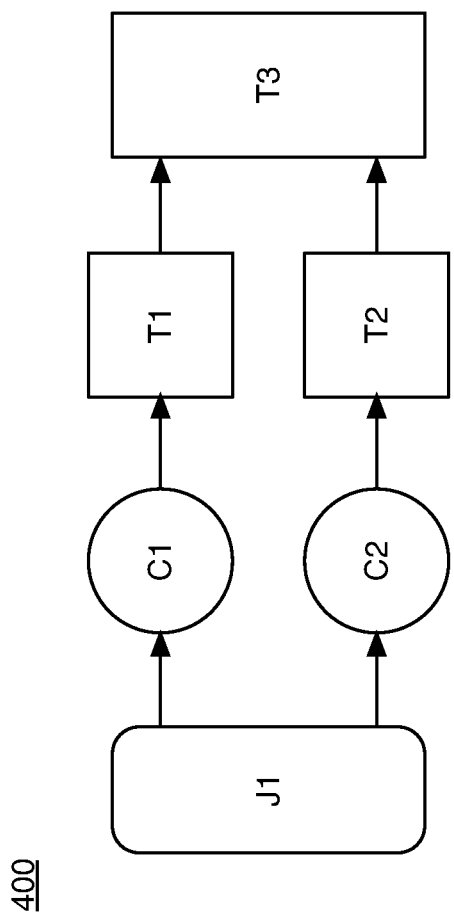

FIG. 4 shows an example of a simple control flow graph 400 that includes a multi-input task node T3, with input links from task nodes T1 and T2 that each follow condition node (C1 and C2, respectively). In this example, the task node T3 corresponds to a logical AND operation such that the tasks of nodes T1 and T2 must both be executed (and not skipped) for the task of node T3 to be executed. Table 5 shows an example of subroutines that would be generated for the control flow graph 400.

TABLE 5

| Node | Subroutine |
| --- | --- |
| junction node J1 | chain(C1); chainTo(C2) |
| condition node C1 | if (<condition1>) |
|  |    chainTo(T1) |
|  | else |
|  |    skip(T1) |
| condition node C2 | if (<condition2>) |
|  |    chainTo(T2) |
|  | else |
|  |    skip(T2) |
| task node T1 | if (skip) |
|  |    skip(T3) |
|  | else |
|  |    T1( ); chainTo(T3) |
| task node T2 | if (skip) |
|  |    skip(T3) |
|  | else |
|  |    T2( ); chainTo(T3) |
| task node T3 | if (skip) |
|  |    return |
|  | else |
|  |    T3( ) |

In some implementations, junction nodes (or other nodes) can be configured to provide various kinds of logical operations that depend on characteristics of the inputs to the node. For example, a node can be configured to provide a logical AND operation when all inputs are designated as "required" inputs, and a logical OR operation when all inputs are designated as "optional" inputs. If some inputs are designated as "required" and some inputs are designated as "optional", then a set of predetermined rules can be used to interpret the combination of logical operations to be performed by the node.

The task control techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for performing tasks, the method including:
   storing, in at least one memory, instructions for performing a plurality of tasks, the instructions including, for each of at least some of the tasks, a respective subroutine that includes a task section for performing that task and a control section that controls execution of a subroutine of a subsequent task; and
   executing, by at least one processor, at least some of the stored subroutines, the executing including:
      spawning a first process for executing a first subroutine for a first task, the first subroutine including a first task section and a first control section; and
      after the first task section returns, calling at least one function included in the first control section that determines whether or not to spawn a second process for executing a second subroutine without calling a central task scheduling process.

2. The method of claim 1, wherein the function is configured to: decrement a counter associated with the second subroutine, and determine whether or not to initiate execution of the second subroutine based on the value of the counter.

3. The method of claim 1, wherein the function, when called with an argument that identifies a second task corresponding to the second subroutine, is configured to determine whether or not to initiate execution of the second subroutine based on state information that captures a history of previous calls of the function with an argument that identifies the second task.

4. The method of claim 3, wherein the function is one of a plurality of different functions, and the state information captures a history of previous calls of any of the plurality of different functions with an argument that identifies the second task.

5. The method of claim 1, wherein the function is configured to: initiate execution of the second subroutine in the first process, and spawn the second process to continue execution of the second subroutine in response to execution time of the second subroutine passing a predetermined threshold.

6. The method of claim 5, wherein the function is configured to provide the second process a stack frame that was associated with the first process.

7. The method of claim 5, wherein the function is configured to return after spawning the second process to enable the first process to continue executing concurrently with the second process.

8. The method of claim 1, wherein the first control section includes logic that determines whether or not the first task section is called.

9. The method of claim 8, wherein the logic determines whether or not the first task section is called based on the value of a flag associated with the first task.

10. The method of claim 1, wherein the second subroutine corresponds to a second task, and the first control section is based at least in part on ordering information that specifies at least a partial ordering among a plurality of tasks that include the first task and the second task.

11. The method of claim 10, wherein the ordering information includes a control flow graph that includes directed edges between pairs of the nodes that represent respective tasks, where a directed edge from an upstream node to a downstream node indicates that the task represented by the upstream node precedes the task represented by the downstream node in the partial ordering.

12. A computer program stored on a non-transitory computer-readable storage medium, for performing tasks, the computer program including instructions for causing a computing system to:
   store instructions for performing a plurality of tasks, the instructions including, for each of at least some of the tasks, a respective subroutine that includes a task section for performing that task and a control section that controls execution of a subroutine of a subsequent task; and
   execute at least some of the stored subroutines, the executing including:
      spawning a first process for executing a first subroutine for a first task, the first subroutine including a first task section and a first control section; and
      after the first task section returns, calling at least one function included in the first control section that determines whether or not to spawn a second process for executing a second subroutine without calling a central task scheduling process.

13. A computing system for performing tasks, the computing system including:
   at least one memory storing instructions for performing a plurality of tasks, the instructions including, for each of at least some of the tasks, a respective subroutine that includes a task section for performing that task and a control section that controls execution of a subroutine of a subsequent task; and at least one processor configured to execute at least some of the stored subroutines, the executing including:

spawning a first process for executing a first subroutine for a first task, the first subroutine including a first task section and a first control section; and after the first task section returns, calling at least one function included in the first control section that determines whether or not to spawn a second process for executing a second subroutine without calling a central task scheduling process.

14. The computing system of claim 13, wherein the at least one function is configured to: decrement a counter associated with the second subroutine, and determine whether or not to initiate execution of the second subroutine based on the value of the counter.

15. The computing system of claim 13, wherein the at least function, when called with an argument that identifies a second task corresponding to the second subroutine, is configured to determine whether or not to initiate execution of the second subroutine based on state information that captures a history of previous calls of the function with an argument that identifies the second task.

16. The computing system of claim 13, wherein the at least one function is configured to: initiate execution of the second subroutine in the first process, and spawn the second process to continue execution of the second subroutine in response to execution time of the second subroutine passing a predetermined threshold.

17. The computing system of claim 16, wherein the at least one function is configured to return after spawning the second process to enable the first process to continue executing concurrently with the second process.

18. The computing system of claim 13, wherein the first control section includes logic that determines whether or not the first task section is called, and wherein the logic determines whether or not the first task section is called based on the value of a flag associated with the first task.

19. The computing system of claim 13, wherein the second subroutine corresponds to a second task, and the first control section is based at least in part on ordering information that specifies at least a partial ordering among a plurality of tasks that include the first task and the second task, and wherein the ordering information includes a control flow graph that includes directed edges between pairs of the nodes that represent respective tasks, where a directed edge from an upstream node to a downstream node indicates that the task represented by the upstream node precedes the task represented by the downstream node in the partial ordering.

20. A computing system for performing tasks, the computing system including:

means for storing instructions for performing a plurality of tasks, the instructions including, for each of at least some of the tasks, a respective subroutine that includes a task section for performing that task and a control section that controls execution of a subroutine of a subsequent task; and means for executing at least some of the stored subroutines, the executing including:

spawning a first process for executing a first subroutine for a first task, the first subroutine including a first task section and a first control section; and after the first task section returns, calling at least one function included in the first control section that determines whether or not to spawn a second process for executing a second subroutine without calling a central task scheduling process.

* * * * *